Dec. 2, 1969 J. W. GRATIAN 3,482,219

FERROACOUSTIC MEMORY

Filed Oct. 26, 1964 4 Sheets-Sheet 1

INVENTOR.
JOSEPH W. GRATIAN

BY Martin Lukacher
ATTORNEY

INVENTOR.
JOSEPH W. GRATIAN
BY [signature]
ATTORNEY

Dec. 2, 1969 J. W. GRATIAN 3,482,219

FERROACOUSTIC MEMORY

Filed Oct. 26, 1964 4 Sheets-Sheet 3

INVENTOR.
JOSEPH W. GRATIAN
BY
ATTORNEY

Dec. 2, 1969 J. W. GRATIAN 3,482,219

FERROACOUSTIC MEMORY

Filed Oct. 26, 1964 4 Sheets-Sheet 4

INVENTOR.
JOSEPH W. GRATIAN

BY Martin L. Kaelin

ATTORNEY 3,482,219

FERROACOUSTIC MEMORY

Joseph W. Gratian, Rochester, N.Y., assignor to General Dynamics Corporation, a corporation of Delaware Filed Oct. 26, 1964, Ser. No. 406,266
Int. Cl. G11b 9/00, 5/00; H03h 3/00
U.S. Cl. 340—173 16 Claims

ABSTRACT OF THE DISCLOSURE

Systems for writing and reading binary data with a ferroacoustic memory device are disclosed. Bi-polar pulses are applied to the line either electromagnetically or mechanically, storing oppositely sensed transitions to represent "1" and "0" bits. The readout system is responsive to the sense of these transitions and recovers the bits. Since a transition is stored in each bit cell along the line, the readout is selfclocking.

Figure 1:
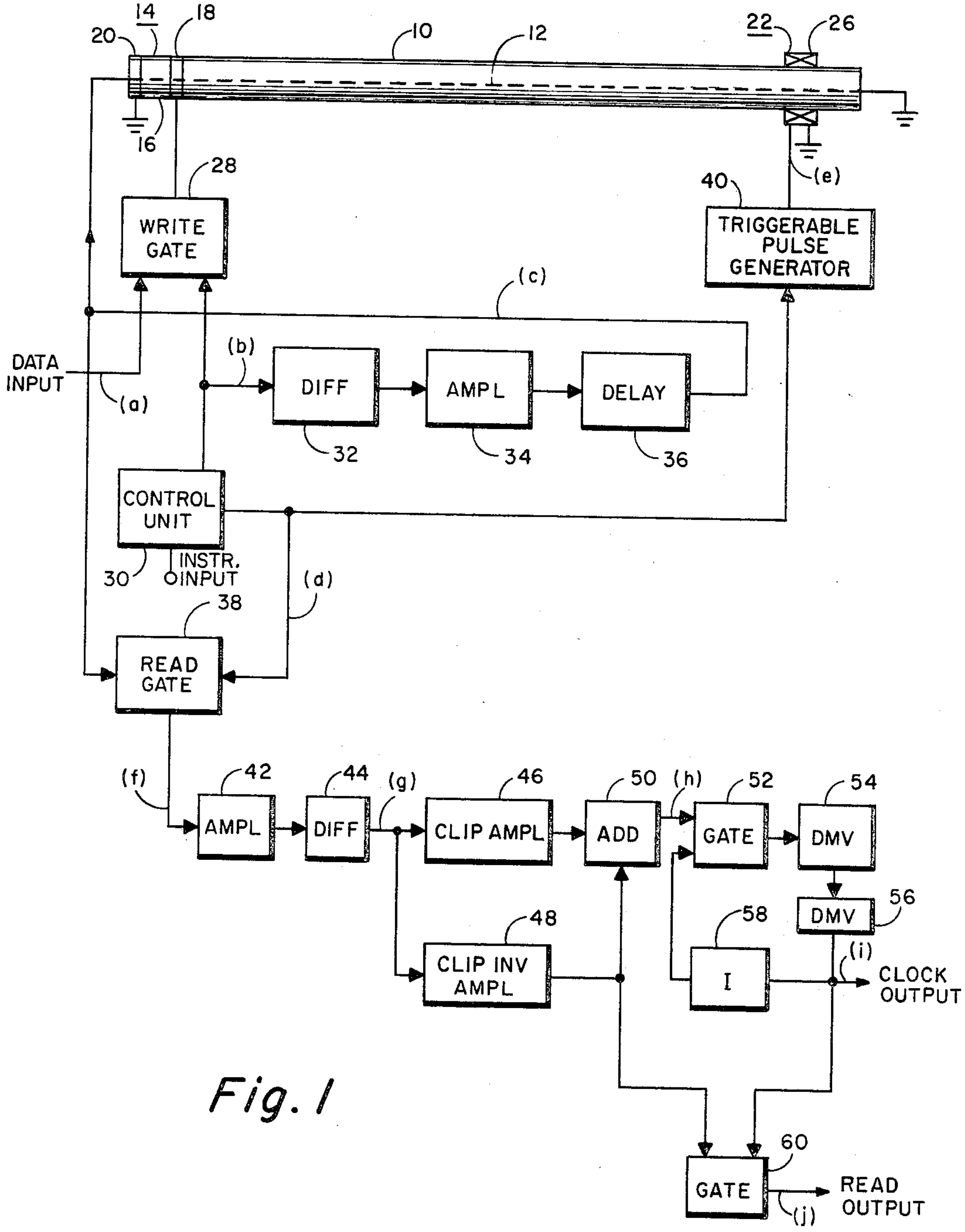

This invention relates to information handling apparatus and particularly to a memory for storing digital data.

The invention is especially suitable for use in apparatus described in application for Letters Patent Ser. No. 184,426, now abandoned, filed by Joseph W. Gratian on Apr. 2, 1962, and assigned to the same assignee as this application.

The apparatus described in the Gratian application includes a line of magnetic material having the characteristic of changing its ability to retain magnetization in the presence of stress. The line is associated with means for its magnetization. Magnetostrictive material, for example, in the form of a tube may provide the line and a conductor extending along the center of the tube may provide the magnetizing means. A transducer is coupled to the line for generating stress pulses which propagate along the line. To write, a stress pulse is propagated along the line. After a delay which determines the point on the line reached by the stress pulse, a short current pulse is applied to the central conductor. Due to the coincident application of the magnetic field and mechanical stress at the same point on the line, the retentivity of the line is enhanced, and the line is magnetized at the point. The magnetized point may represent a stored data element such as a bit, and the location of the point is the address of that bit. To read, a stress pulse is again propagated along the line. After a delay, corresponding to the address of the bit, a gate coupled to the central conductor is enabled momentarily. An electrical pulse representing the bit is induced in the conductor and read out through the gate. In other words, readout results from the movement of the stress pulse between line increments of different strain sensitivity respectively representing an unrecorded line portion and the recorded bit. By strain sensitivity is meant the change in induction or flux density which results from a change in stress in the line material. The memory apparatus described above is termed a "ferroacoustic" memory.

It is an object of the present invention to provide improved systems for writing and reading information in coincident stress and current information storage apparatus.

It is another object of the present invention to provide improved systems for high density recording of data in a coincident stress and current memory of the ferroacoustic type.

It is still another object of the present invention to provide improved systems for writing and reading out digital data in a memory of the ferroacoustic type which is more immune to noise than known writing and reading techniques.

It is a further object of the present invention to provide improved systems for writing and reading information in the information storage line of a memory of the ferroacoustic type which uses the material properties of the line to advantage.

Briefly described, a writing and reading system embodying the invention uses a line of information storage material, for example magnetostrictive material, means for propagating mechanical signals along that line and means for applying a field to the line. Data representing signals are applied to one of the propagating means and field applying means. These signals are bidirectional and have opposite senses for respectively representing data of different significance, say binary "1" and "0" bits. Accordingly, each recorded item of data is represented by the sense of a change in a signal stored in the line. Means responsive to the sense of change of the signal which is produced when a mechanical readout signal is propagated along the line is operative to recover the stored data.

Referring to FIG. 1, there is shown a ferroacoustic memory device made up of a line of retentive magnetic material 10. This line is in the form of a tube which may be about two feet in length. The tube is preferably constituted of a magnetostrictive material, such as a 50% nickel-50% iron alloy which has been annealed. This material has a high degree of strain sensitivity to mechanical signals in the form of stress levels or pulses. The stress pulses which travel in a direction longitudinally along the line affect the magnetization characteristics of the line in a direction circumferentially thereof, that is, in a direction transverse to the direction of propagation of the stress pulses.

In order to magnetize the line, a current-carrying element in the form of a conductor 12 is disposed on the inside of the tube which forms the line. This conductor 12 is magnetically linked to the line and establishes a magnetic field circumferentially of the line for magnetizing the line. Since the line is more sensitive to magnetization in the presence of stress, increments of the line at which compressive stress and magnetizing field are simultaneously present are magnetized and have a higher magnitude of remanence after the application of the magnetizing field and the stress pulse than other increments of the line where only the magnetizing field alone is present.

An electromechanical transducer 14 is coupled to one end of the line 10. This transducer is shown as comprising a body of piezoelectric material 16 which is sandwiched between electrodes 18 and 20. This transducer is capable of generating bidirectional mechanical signals in the form of stress pulses which may be either compressive or tensive. Voltages of one polarity applied across the electrodes 18 and 20, say positive, will generate a compressive stress pulse which propagates along the line 10, whereas voltages of opposite polarity, say negative, generate tensive stress pulses which propagate along the line 10. A compressive stress pulse is followed by a tensive stress pule and vice-vera as will be brought out more fully hereinafter.

Another electromechanical transducer 22 is provided at the opposite end of the line 10. This transducer is a magnetostrictive transducer and is formed by a coil 26 which is wound around the magnetostrictive tube which forms the line 10. It may be desirable to utilize a similar magnetostrictive transducer in place of the piezoelectric transducer 14. In such event it will be necessary to polarize that transducer, for example, by passing a constant biasing current through the coil thereof in order that current of opposite polarity with respect to the bias current will generate bidirectional stress pulses as does the piezoelectric transducer 14.

A system including the ferroacoustic memory device and circuits to be described hereinafter, is provided for writing and reading out digital data. This digtal data is indicated, by way of example, as a series of binary bits. These bits may be in the form of voltage pulses of opposite polarity, as shown in waveform *a* of FIG. 2, which are applied to the transducer 14 through a write gate 28. This gate 28 is an AND gate which is enabled by a command signal from a control unit 30. This command signal may be of a level of voltage as indicated in waveform *b* of FIG. 2. The control unit itself may be a decoder of the type known in the art which translates an instruction code applied thereto at an instruction input into command levels on appropriate output lines. Accordingly, when the command level enables the gate 28, voltage pulses representing the data are applied to the transducer 14. These voltage pulses are spaced in time from each other. The spacing is desirably equal to the time of propagation of a stress wave through the transducer in order to maxinize the amount of data which can be stored on the line (also called the pulse packing or bit density of the stored data).

When a voltage pulse is applied across the electrodes 18 and 20 of the transducer, the piezoelectric part 16 of the transducer expands, say for a positive voltage pulse, and contracts, say for a negative voltage pulse. The time required for such expansion or contraction is equal to the ratio of the length of the transducer to the velocity of sound in the transducer material. Accordingly, the time between successive pulses is equal to the length of the transducer divided by the velocity of sound propagation in the transducer material. Appropriate spacing of the successive bits in the series of bits applied to the data input may be accomplished by a means of a shift register or other known buffer storage device. For the series of bits "1", "0", "1", "0", "0", "1", and "1", illustrated in FIG. 2, a sequence of compressive and tensive waves illustrated in the waveform shown in FIG. 2 and identified by the letter $\sigma$ is established in the line. The compressive and tensive waves due to the first "1" bit appears on the right-hand end of the line. Accordingly, the waveform $\sigma$ is taken from right to left along the line 10. It is this wave of stress and tension which is established in the line 10, after the last "1" bit is applied from the data input line. Compressive and tensive stress pulses, or vice versa, follow each other as they propagate along the line. When the transducer 14 expands, say in response to a positive voltage, its transducer contracts after that voltage ends. Accordingly, a tensive stress pulse will follow a compressive stress pulse. Similarly, when a tensive stress pulse is generated in response to a negative voltage applied across the transducer 14, a compressive stress pulse follows that tensive stress pulse.

At the end of the command signal level (waveform *b*) which coincides with the end of the last of the series of bits (waveform *a*), a current pulse, shown in waveform *c*, is applied to the conductor 12 and establishes a magnetic field which magnetizes the line. This current pulse may be generated by a differentiating circuit 32 which differentiates the command level providing positive and negative pulses respectively corresponding to the leading and lagging edges thereof. These pulses are applied to a clipping amplifier 34 which permits only the pulse corresponding to the lagging edge of the command level to be available to trigger a relay multivibrator 36. This delay multivibrator generates the short current or write pulse indicated in waveform *c* of FIG. 2.

Since the line 10 is more sensitive to magnetization in increments thereof which are under compressive stress than those which are increments which are under tensive stress, the remanent induction in the line or remanence of the line, will be higher in those increments which are under compressive stress. Tensive stress may cause a decrease in the remanent induction relative to unstressed line increments. It follows that the line will be magnetized in a manner corresponding to a stress wave which appears in the line at the instant that the write current pulse $I_W$, indicated in waveform *c*, is applied to the conductor 12. This remanent induction $B_S$ is illustrated in the lowermost of the waveforms shown in FIG. 2.

Figure 3:
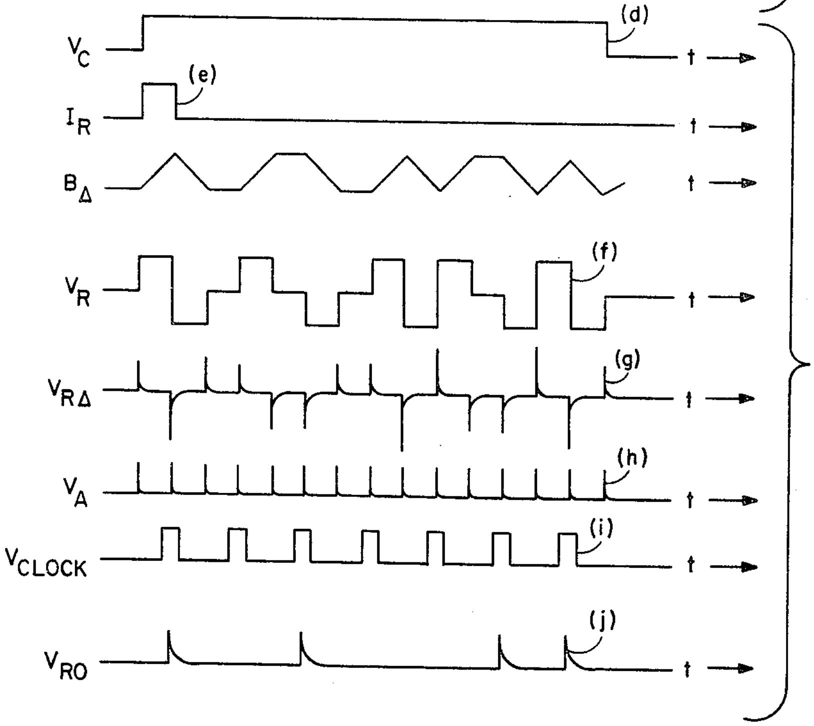

To readout the digital data which is stored in the line, the control unit 30 is instructed to generate another level $V_C$ indicated in waveform *d* of FIG. 3 in response to a readout instruction input code. This level is applied to a read gate 38 as an input thereto. Another input to the read gate is the conductor 12. The command level enables the read gate, which may be an AND gate, to read out any signals which may be induced into the conductor 12. The command level is also applied to a triggerable pulse generator 40 which generates a readout current pulse $I_R$ shown in waveform *e* of FIG. 3. This current pulse is applied to the magnetostrictive transducer 22 and generates a mechanical signal in the form of a compressive stress pulse, which may be followed by a tensive stress pulse and which propagates along the line in a direction from right to left. Accordingly, the first signal which is written into the line will be the first signal which is read out of the line. Alternatively, the command level may be applied directly to the transducer 22 for generating a compressive stress pulse corresponding to the leading edge of that level.

As the readout mechanical pulse propagates along the line, it changes the induction of the line. Accordingly, a change in induction corresponding to the rate of change of the remanent induction therein is produced. This change of induction is illustrated in waveform $B_A$ (FIG. 3) and is produced in response to the propagation of the readout stress pulse. A voltage $V_R$ corresponding to this change in induction, and indicated in waveform *f* of FIG. 3, is induced into the conductor 12 and is read out through the enabled read gate 38 into a shaping amplifier 42. A differentiator 44 differentiates this readout voltage, producing a series of pulses corresponding to the transitions therein. Such transitions occur in coincidence with the transitions in the stored magnetization on the line. In other words the differentiator 44 produces an output pulse for each change in induction on the line. The sense or polarity of these differentiator pulses also corresponds to the sense of the change in magnetization along the line. By means of clipping amplifier 46 and another clipping amplifier 48, the positive and negative going differentiator output pulses are respectively separated into two channels. The clipping amplifier 48 also inverts the negative-going pulses and provides a string of positive-going pulses corresponding thereto. The positive pulses from both channels are combined in an adder circuit 50, which may simply be a resistor network, to provide a sequence of pulses $V_A$ indicated in waveform *h* of FIG. 3.

These pulses are applied through an AND gate 52 to a first delay multivibrator 54. The output of this delay multivibrator 54 triggers another delay multivibrator 56. The first of a pair of pulses of a combined pulse train $V_A$ (waveform *h*) triggers the first delay multivibrator 54. This multivibrator produces an output pulse having duration slightly more than one-half the period between successive pulses in the pulse train $V_A$. The lagging edge of the first delay multivibrator output pulse is utilized to trigger the second delay multivibrator. The second delay multivibrator then produces a pulse which coincides with the pulse of the waveform $V_A$ next succeeding the pulse which triggered the delay multivibrator 54. Accordingly, the output of the second multivibrator 56 is a series of pulses corresponding to alternate ones of the pulse in waveform $V_A$. These pulses coincide with the data bits and provide a clock output, i.e., there is one clock pulse for each data bit. It will be observed therefore, that the information storage system is self-clocking since no additional clock signals need be stored along the line 10 or along another line which might be reserved for that pulpose. These clock pulses are indicated as the waveform $V_{clock}$ and are shown in waveform *i* of FIG. 3. The clock pulses are applied through an inverter circuit 58 to the gate 52 and inhibit that gate so that alternate pulses in the waveform $V_A$ are not applied to the first delay multivibrator 54.

The clock pulses are also applied to a gate 60 together with the pulses from the channel which derive the negative-going ones of the differentiator 44 output pulses. It will be noted that these pulses correspond to the negative-going transitions of the stored induction $B_S$. It will further be noted that a negative-going transition of the stored induction corresponds to a "1" data bit, since such negative-going transitions in the data bit voltage $V_{data}$ (waveform *a* FIG. 2) occur in the middle of a bit interval. Accordingly, the clock pulse enables the gate 60 during the middle of each bit interval. The occurrence of a negative going signal during such time as the gate 60 is enabled is indicative of a binary "1" bit. The output of the gate is the signal $V_{R_0}$ shown in waveform *j* of FIG. 2, having a positive-going pulse for each recorded "1" bit. These pulses, together with the clock output, may be applied to digital data transmission or utilizing means for further processing.

Figure 2:
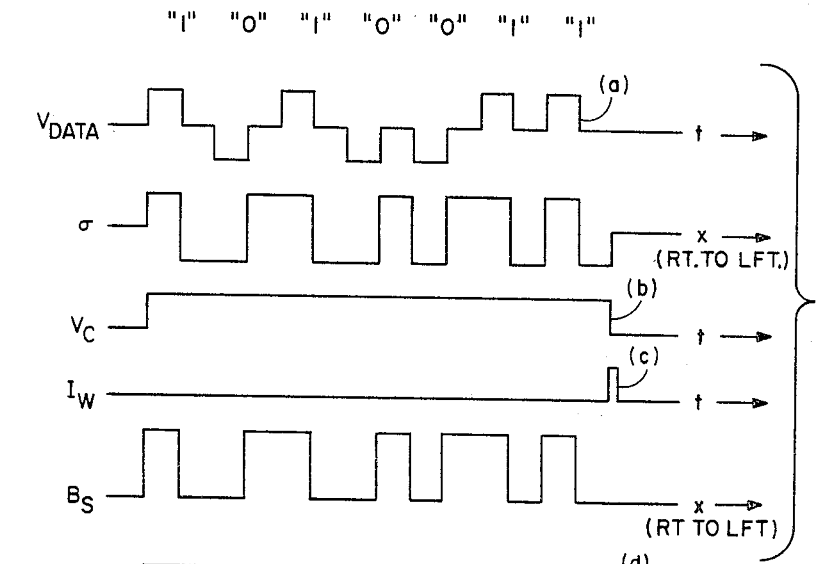
Figure 4:
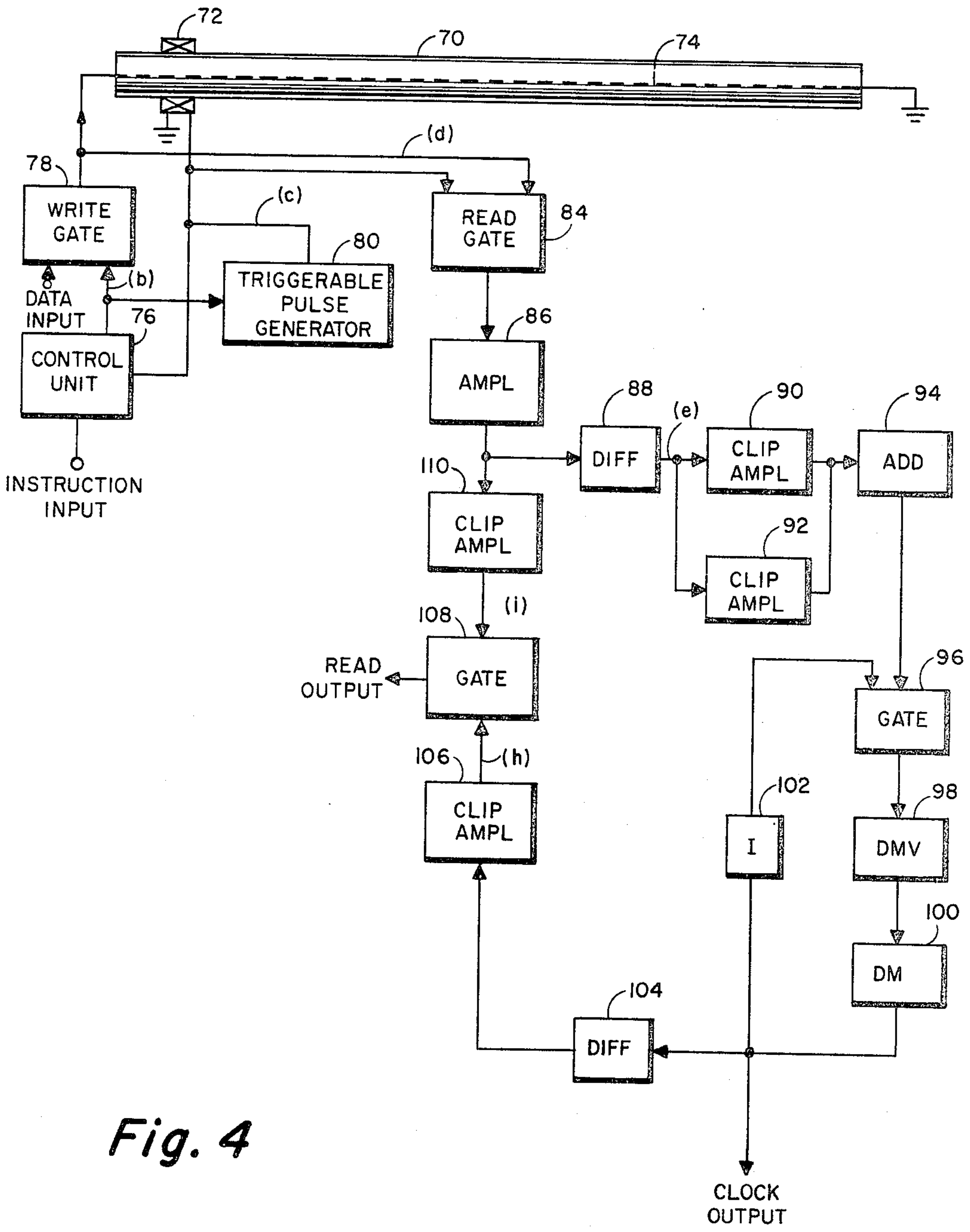

Referring to FIG. 4, there is shown a ferroacoustic information storage line 70 which may be similar to the line 10 in FIG. 2. A transducer 72 in the form of a coil wound around a portion of the line near one end thereof, serves to generate and propagate stress pulses along the line. A conductor 74 which is threaded through the tube provides a means for establishing a magnetizing field in a direction circumferentially of the line.

Figure 5:
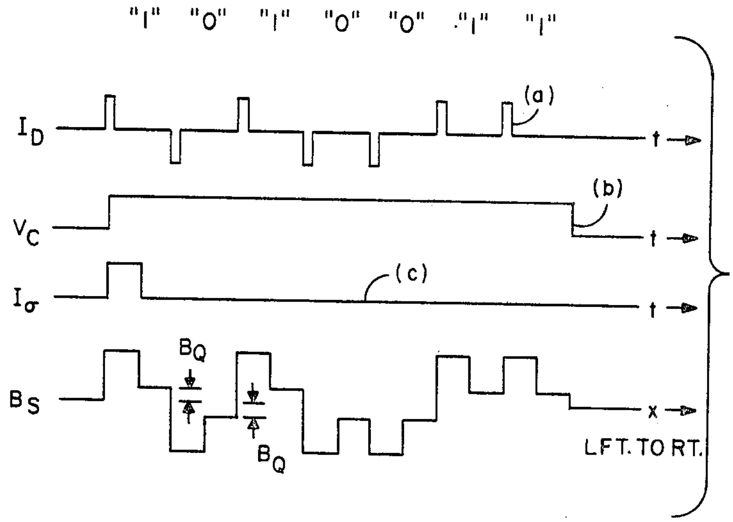

A control unit 76 responsive to an instruction input, provides a level $V_C$ (waveform *b* of FIG. 5), which permits the passage of current pulses $I_D$ (waveform *a* of FIG. 5) through a write gate 78 to the conductor 74. The data input is in the form of a series of positive and negative-going current pulses.

The command level $V_C$ is applied to a triggerable pulse generator 80 which generates a current pulse $I_\sigma$ (waveform *c* FIG. 5) which is desirably of duration equal to the time of propagation of an acoustic wave through the transducer 72, that is, the duration of the current pulse $I_\sigma$ is equal to the axial length of the coil divided by the velocity of sound in the magnetostrictive line material. Accordingly, a compressive stress pulse will be generated which has a duration equal to the duration of the current pulse $I_\sigma$. This compressive stress pulse is followed by a tensive stress pulse of like duration which is produced as the material of the line under the coil contracts.

The line 70 is magnetized in opposite directions by the current pulse $I_D$ which is applied to the line. This magnetization may have a certain quiescent level $B_Q$, either positive or negative in those increments of the line where the current pulses $I_D$ are present. Magnetization is much greater in those increments of the line affected by simultaneous compressive stress pulses and magnetization. Accordingly, the line 70 has a remanent magnetization shown by the curve $B_S$ in FIG. 5. Only the quiescent magnetization $B_Q$ remains in the line where the compressive stress pulse is not simultaneously present with a current pulse $I_D$. The line has much larger magnetization either in a positive or negative sense, depending upon whether a current pulse representing a "1" or an "0" is stored therein. It will be noted that the stored magnetization changes in a sense depending upon the value of the bit which is stored in the line. The sense of change is negative for binary "1" bits and positive for binary "0" bits. The increment of the line in which each bit is stored has such sense of change of magnetization approximately in the center thereof.

Figure 6:
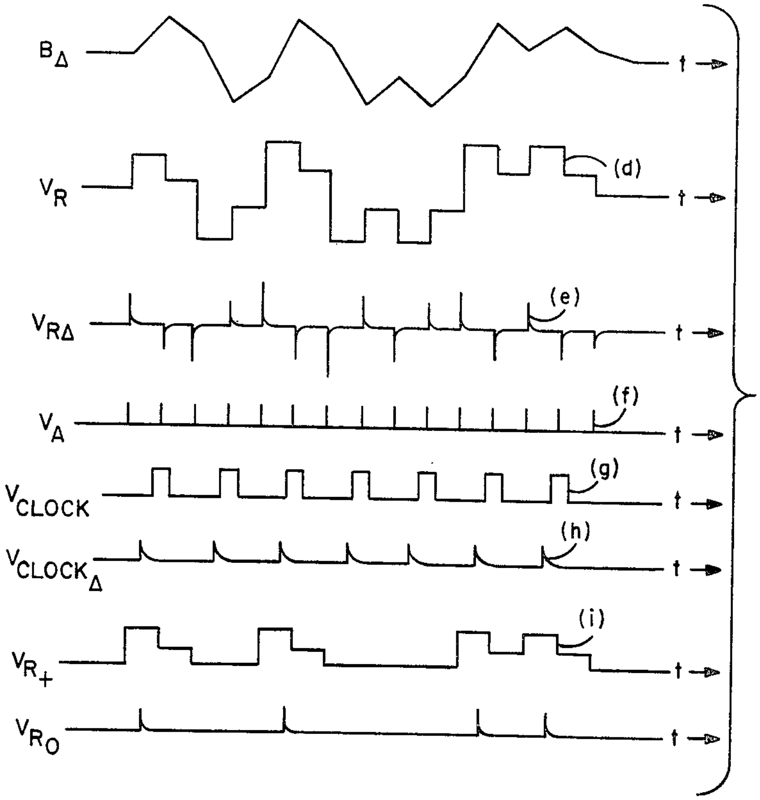

Read gate 84, which is input connected to the conductor 74 and to an output of the control unit 76 which provides a read enable command level, is output connected to the shaping amplifier 86. The read command level is also appiled to the transducer 72 and causes the propagation of a stress pulse along the line 70. The stress pulse causes the remanent induction in the line to change as the pulse propagates therealong. This change depends, in magnitude and in sense, upon the induction which is stored in the line. Accordingly, the stored induction $B_S$ is effectively differentiated by the propagating readout stress pulse. This change in induction $B_\Delta$ is shown in FIG. 6 and causes a readout voltage $V_R$ to be induced into the conductor 74. Since the voltage which is induced into the conductor is a function of the rate of change in line induction, a readout voltage waveform which is similar to the induction $B_S$ (FIG. 5) which was originally stored in the line, appears at an input to the read gate 84. This voltage $V_R$ is indicated in waveform *d* of FIG. 6.

After the shaping in the amplifier 86, the readout voltage is differentiated by a differentiating circuit 88. The differentiated output voltage $V_{R\Delta}$, indicated in waveform *e* of FIG. 6, includes a positive or a negative-going pulse for each transition in the readout voltage. Since such transitions occur at the beginning and in the middle of each bit interval, a series of approximately equally spaced pulses is provided. These pulses are segregated according to their polarity, either positive-going or negative-going, into two channels by means of clipping amplifiers 90 and 92. The amplifier 92 also inverts the pulses to provide positive pulses. The output pulses of both clipping amplifiers 90 and 92 are added in an adding circuit 94 which may be a resistor network, and applied to a system including a gate 96, first delay multivibrator 98, a second delay multivibrator 100 and an inverter 102, which provides a clock pulse corresponding to alternate ones of the differentiator 88 output pulse. The output pulse of the adding circuit 94 is indicated as $V_A$ and is shown in waveform *f* of FIG. 6 and the clock pulses are shown in waveform *g* of FIG. 6. The system of circuits 96, 98, 100 and 102 is similar to the circuits 52, 54, 56, and 58 of FIG. 1. Accordingly, reference may be had to the description of the latter circuits.

The data bits may be derived by utilizing the clock pulses to indicate the middle of the bit period and utilizing the readout voltage to indicate when signals having polarities representing the value of the bits appear. To this end, the clock pulses are differentiated in a differentiating circuit 104 and applied to a clipping amplifier 106, which obtains only a pulse corresponding to the leading edge of the clock pulses. The output to this clipping amplifier provides an input to an AND gate 108. The readout voltage, at the output of the amplifier 86, is clipped to remove the negative portion thereof and to pass only the positive-going portion thereof. Since a binary "1" bit occurs when a positive magnetization is stored in the first half of a bit increment in the line, a positive readout voltage $V_{R+}$, which occurs during the first half of a bit period and which is obtained at the output of the clipping amplifier 110, is indicative of a binary "1" bit. This clipped portion of the readout voltage $V_{R+}$ is indicated in waveform *i* of FIG. 6. Waveform *h* of FIG. 6 indicates the output of the clipping amplifier 106. The gate 108 is enabled only during a portion of the first half of each bit interval. If the clipping amplifier 110 output $V_{R+}$ is positive during the first half of the bit increment, a readout voltage $V_{R_0}$ in the form of a positive pulse is provided. Each such positive pulse represents a binary "1" bit. Accordingly, the clock pulse $V_{clock}$ and the readout voltage $V_{R_0}$ may be used to represent the stored data and may be applied to data transmission or other data utilization means such as a computer, for further data processing.

From the foregoing description it will be apparent that there has been provided an improved system for storing information, while two embodiments of ferroacoustic memory apparatus have been described. Modification of such apparatus and other modifications within the scope of the invention will, undoubtedly, become apparent to those skilled in the art. Accordingly, the foregoing description should be considered merely as illustrative and not in any limiting sense.

What is claimed is:

1. A system for storing information comprising a body of material having an information storage property which is a function of a field and a mechanical signal applied thereto, means for simultaneously applying a field and a mechanical signal to said body, and means responsive to the information to be stored in said body for changing the direction of one of said field and said mechanical signal in a sense corresponding to the significance of said information.

2. A system for storing data comprising a signal retentive medium having a signal retentive property which is a function of stress applied thereto, means for simultaneously applying stress and said signal to said medium, and means responsive to said data for changing the sense of one of said signal and said stress in response thereto.

3. A system for storing data comprising a medium having storage for signals in a plurality of discrete increments thereof, means for applying a field and a mechanical signal simultaneously and individually to said increments, and means responsive to said data for controlling the sense of one of said field and said mechanical signal.

4. A system for storing digital data comprising a medium having storage for different items of said data in successive increments thereof, means for propagating mechanical signals along said medium to said increments for changing the data storage property thereof, means responsive to an electrical signal for applying a field to said medium in timed relationship to said mechanical signals, and means responsive to said data for changing the direction of one of said mechanical and electrical signals.

5. A system for writing digital data on a line of signal retentive material comprising means for propagating mechanical signals along said line, means for establishing a field in said line, means coupled to said propagating means for controlling the sense of said mechanical signals in accordance with the significance of each item of said data, and means for establishing said field when the mechanical signal representing the first item of said data has propagated to a predetermined point on said line.

6. A system for storing a series of successive items of digital data on a line of signal retentive material comprising means responsive to said data for propagating a series of stress pulses corresponding to said series of items, corresponding ones of said stress pulses and said data items in said series having senses which correspond to each other, and means for applying a field to said line after occurrence of the last of said series of items.

7. A system for storing a series of successive bits of binary data comprising a line of signal retentive material, an electromagnetic transducer coupled to said line for propagating stress pulses therealong, means responsive to said data for propagating a series of bi-directional stress pulses which, change in sense in opposite directions to represent said bits of opposite value, and means linked to said line for applying a field thereto immediately after the last bit of said series.

8. A system for storing a series of bits of digital information on a line of retentive magnetic material comprising a polarized electromechanical transducer coupled to said line for propagating bi-directional stress pulses therealong, a conductive element magnetically linked to said line, for magnetizing said line when current is passed therethrough, means for applying to said transducer a series of pulses which correspond to said bits and have opposite polarities for respectively representing bits of opposite value, and means for passing a pulse of current through said transducer coincident with the termination of the last of said series of bits.

9. A system for writing and reading digital information in a ferroacoustic memory including a line of magnetostrictive magnetic material, a piezoelectric transducer, an electromagnetic transducer, said transducer being coupled to opposite ends of said line, and an element adapted to carry current magnetically linked to said line, said system comprising means for applying a series of spaced data pulses having opposite polarities which represent oppositely valued bits of said information to said piezoelectric transducer, means for applying a current pulse to said element at the termination of said series of data pulses whereby to magnetize said line and store said bits therein in accordance with the sense of change of magnetization in successively spaced line increments, means for applying a pulse to said electromagnetic transducer for reading out said stored bits, and means responsive to signals induced into said element for deriving said stored bits upon application of said reading out pulse.

10. A system for storing information in a line of signal retentive material comprising means for propagating a mechanical signal along said line, and means for applying oppositely polarized fields each representing a separate item of said information to said line in timed relation with said mechanical signal for storing said items in different increments of said line.

11. A system for writing and reading information in a line of signal retentive material comprising means for propagating a mechanical signal along said line, means for applying oppositely polarized fields each representing a separate item of said information in timed relation with said mechanical signal for storing said items in successive increments of said line, means for subsequently propagating another mechanical signal along said line, and means responsive to the change in sense of the field resulting from propagation of said other mechanical signal for deriving said stored items of information.

12. A memory system comprising a line of retentive magnetic material, an electromechanical transducer coupled to said line for propagating a stress pulse therealong, a conductive element magnetically linked to said line, means for applying a series of current pulses of opposite polarity respectively representing oppositely valued bits of digital information to said element during the propagation of said stress pulse for writing said bits in accordance with the sense of change of magnetization in successive increments of said line.

13. A memory system comprising a line of magnetostrictive magnetic material, means coupled to said line for propagating a stress pulse therealong, a conductor extending along said line and magnetically linked to said line, means for passing a series of current pulses of opposite polarity respectively representing oppositely valued bits of digital information through said conductor in timed relation with said stress pulse for writing said bits in accordance with the sense of change of magnetization in successive increments of said line.

14. A memory system comprising a tube of magnetostrictive magnetic material, a coil around said tube near one end thereof for propagating a stress pulse therealong when energized, means for applying to said coil a current pulse having a duration equal to the axial length of said coil divided by the velocity of sound in said tube, a conductor extending through said tube, means for applying a series of current pulses of opposite polarity respectively representing oppositely valued bits of digital information to said element during the propagation of said stress pulse for writing said bits in accordance with the sense of change of magnetization in successive increments of said line, each of said series of pulses being shorter in duration than said first named current pulse.

15. A memory system comprising a line of retentive magnetic material, an electromechanical transducer coupled to said line for propagating a stress pulse therealong, a conductive element magnetically linked to said line, means for applying a series of current pulses of opposite polarity respectively representing oppositely valued bits of digital information to said element during the propagation of said stress pulse for writing said bits in accordance with the sense of change of magnetization in successive increments of said line, means for propagating another stress pulse along said line, and means coupled to said element responsive to the sense of change in the amplitude of the signal induced into said element for deriving said stored bits.

16. A memory system comprising a line of magnetostrictive magnetic material, means defining a magnetostrictive transducer coupled to said line for propagating a stress pulse therealong, a conductive element magnetically linked to said line, means for applying a series of current pulses of opposite polarity respectively representing oppositely valued bits of digital information to said element during the propagation of said stress pulse for writing said bits in accordance with the sense of change of magnetization in successive increments of said line, means for applying a current pulse to said transducer for propagating another stress pulse along said line, and at least one differentiating circuit coupled to said element responsive to the sense of change in the amplitude of the signal induced into said element for deriving said stored bits.

References Cited

UNITED STATES PATENTS

| | | | |
|---|---|---|---|
| 3,339,188 | 8/1967 | Weinstein | 340—173 |
| 3,286,099 | 11/1966 | Irons | 340—173 |
| 3,320,596 | 5/1967 | Smith | 340—174 |

FOREIGN PATENTS

| | | |
|---|---|---|
| 873,367 | 7/1961 | Great Britain. |

TERRELL W. FEARS, Primary Examiner

U.S. Cl. X.R.

333—30; 340—174